United States Patent [19]

Waite et al.

[11] 4,228,503
[45] Oct. 14, 1980

[54] MULTIPLEXED DIRECTORY FOR DEDICATED CACHE MEMORY SYSTEM

[75] Inventors: John C. Waite, St. Paul; David J. Baber, Shoreview, both of Minn.

[73] Assignee: Sperry Corporation, New York, N.Y.

[21] Appl. No.: 947,791

[22] Filed: Oct. 2, 1978

[51] Int. Cl.³ ............................................. G06F 13/00
[52] U.S. Cl. ............................................................. 364/200
[58] Field of Search ................................. 364/200, 900

[56] References Cited

U.S. PATENT DOCUMENTS

| | | | |
|---|---|---|---|
| 3,581,291 | 5/1971 | Iwamoto et al. | 364/200 |
| 3,735,360 | 5/1973 | Anderson et al. | 364/200 |
| 3,848,234 | 11/1974 | MacDonald | 364/200 |
| 4,048,671 | 9/1977 | Callahan et al. | 364/200 |
| 4,056,844 | 11/1977 | Izumi | 364/200 |
| 4,070,706 | 1/1978 | Scheuneman | 364/200 |
| 4,136,386 | 1/1979 | Annunziata et al. | 364/200 |
| 4,141,067 | 2/1979 | McLagan | 364/200 |
| 4,142,234 | 2/1979 | Bean et al. | 364/200 |
| 4,144,566 | 3/1979 | Timsit | 364/200 |
| 4,157,587 | 6/1979 | Joyce et al. | 364/200 |

Primary Examiner—Charles E. Atkinson
Assistant Examiner—Gary Chin
Attorney, Agent, or Firm—Kenneth T. Grace; William E. Cleaver; Marshall M. Truex

[57] ABSTRACT

Apparatus for avoiding ambiguous data in a multi-requestor computing system of the type wherein each of the requestors has its own dedicated cache memory. Each requestor has access to its own dedicated cache memory for purposes of ascertaining whether a particular data word is present in its cache memory and of obtaining that data word directly from its cache memory without the necessity of referencing main memory. Each requestor also has access to all other dedicated cache memories for purposes of invalidating a particular data word contained therein when that same particular data word has been written by that requestor into its own dedicated cache memory. Requestors and addresses in a particular cache memory are time multiplexed in such a way as to allow a particular dedicated cache memory to service invalidate requests from other requestors without sacrificing speed of reference or cycle time of the particular dedicated cache memory from servicing read requests from its own requestor.

6 Claims, 5 Drawing Figures

MULTIPLEXED DIRECTORY FOR DEDICATED CACHE MEMORY SYSTEM

BACKGROUND OF THE INVENTION

This invention relates generally to a main memory/cache memory hierarchy for use in a multi-requestor computing system and more specifically to apparatus for preventing ambiguous data in such a system where each requestor has its own dedicated cache memory.

In a multi-requestor configuration, wherein each of the requestors has associated with it its own low capacity and fast cycle time dedicated cache memory and a high capacity and slow cycle time main memory which is shared by all of the requestors, a problem arises when the contents of a main memory address may be resident or stored in one or more requestor's dedicated cache memories at one instant of time and another requestor stores information in the form of a data word into that main memory address in the main memory or in its own dedicated cache memory. If one of the plural requestors modifies that data word with, e.g., a write operation, steps must be taken in order to preserve the integrity of the data word lest a requestor obtain a data word from its own dedicated cache memory that is no longer current because of a write operation performed by a different requestor.

Several methods of handling this problem exist in the prior art and may be characterized as "write-through," "post-write" and "write-by" cache memory systems. In a "write-through" system the write operation occurs in a given requestor's dedicated cache memory. The data word located in that cache memory is modified and at the same instant the data word having the same address in main memory is also modified. Thus, the modified data word is made available to all other requestors in the system so long as the requestors obtain that data word from the main memory rather than from their own dedicated cache memories. However, since the same data word may also be resident in the dedicated cache memories of other requestors, the system must provide a means to either modify the data word in those dedicated cache memories or to notify those other requestors to obtain that particular data word from main memory and not from their dedicated cache memories.

In a "post-write" system when a write operation is performed upon a data word that is resident in the writing requestor's dedicated cache memory the data word is modified in the cache memory but is not at that time modified in main memory. At a later time, for example when a least-recently-used algorithm or similar behaving algorithm determines that a block of data words that has been modified is to be replaced, a modified data word must be written into the main memory to thereby preserve the integrity of the data within the system.

In the so-called "write-by" cache memory approach, a write operation is performed in main memory but not in the writing requestor's own dedicated cache memory. Thus, not only must other requestors in a multi-requestor environment obtain their data word at a subsequent time only from main memory but so too must the writing requestor.

A general discussion of the foregoing cache buffer memory systems for a multi-requestor environment is described in the David L. Anderson, et al, U.S. Pat. No. 3,735,360, entitled "High Speed Buffer Operation In A Multiprocessing System" which is assigned to the International Business Machines Corporation.

The present invention is directed toward preventing ambiguous data in all of these various dedicated cache memory systems by notifying other requestors that a data word that is contained in their own dedicated cache memories is invalid due to a write operation performed by another requestor in its dedicated cache memory or in main memory. The technique described in the present invention involves "invalidating" the data word that is contained in a dedicated cache memory so that that dedicated cache memory's own requestor, when accessing that particular data word, will not obtain that data word directly from its own dedicated cache memory but will instead obtain the updated or modified data word from main memory. Note that the system described in the present invention will work whether the updated data word is stored in main memory either on a "write-through," "post-write" or "write-by" basis.

When one requestor performs a write operation on a data word in its own dedicated cache memory, that requestor must then have access to all other dedicated cache memories in order to perform this invalidate operation. If the written or modified data word is found contained in another dedicated cache memory, then that data word must be invalidated at that location. If the particular data word written is not found in another dedicated cache memory, then no invalidate operation need be performed, but it still has been necessary to perform the search operation in order to ascertain that the written data word is not contained in the other dedicated cache memories.

A single dedicated cache memory is comprised mainly of two basic parts, a data buffer and a tag buffer. The data buffer contains those data words that are held in the dedicated cache memory for fast access by that dedicated cache memory's own requestor. The tag buffer contained in the dedicated cache memory contains a list or a table of addresses of the data words that are contained in the data buffer. Thus, when a requestor wishes to access a particular data word it accesses the tag buffer and searches the list of available addresses to ascertain whether that particular data word is resident in the data buffer. If a match is made in the tag buffer then the data word is accessed directly by the requestor from the data buffer. If a match does not occur in the tag buffer the requestor then must either sequentially or concurrently with access to the dedicated cache memory, request that data word from main memory and obtain that data word from main memory.

In general, a requestor needs access to both the tag buffer and the data buffer of its own dedicated cache memory. However, any requestor other than the resident requestor that is specifically dedicated to that dedicated cache memory (a non-resident requestor) needs to have access only to the tag buffer portion of any other requestor's dedicated cache memory. This is because a requestor never accesses data words from another requestor's dedicated cache memory. A requestor is required to have access to only the tag buffer portion of another requestor's dedicated cache memory for purposes of invalidating the addresses listed therein.

SUMMARY OF THE INVENTION

The present invention solves the problem of having ambiguous data in a multi-requestor dedicated cache memory system by allowing every requestor to have access to each other requestor's dedicated cache memory. Each resident requestor has access to the tag buffer portion of its dedicated cache memory and to the data buffer portion of its dedicated cache memory. In addition, each requestor has access to the tag buffer portion of the dedicated cache memories to which it is not dedicated or resident. When a resident requestor performs a write operation on a data word contained in its dedicated cache memory that data word is written in its dedicated cache memory's data buffer and may also either initially or subsequently be written into main memory. At the same time the resident requestor, either directly or through a central invalidation module for all non-resident requestors, must access every other tag buffer contained in all other non-resident dedicated cache memories in order to set an invalid semaphore or tag bit in the tag buffer portion of those non-resident dedicated cache memories.

Since the tag buffer portion of a dedicated cache memory may generally be constructed of memory modules having a much faster cycle time than the memory modules from which the data buffer is constructed, a resident requestor having access to its own dedicated cache memory must access both the tag buffer and the data buffer and its cycle time in obtaining that request is governed by the cycle time of the slowest memory unit, that is the data buffer. If the tag buffer is significantly faster in operation than the data buffer, the resident requestor will finish with the tag buffer before it is done with the data buffer. In such a case the tag buffer is then available in the latter part of the resident requestor's cycle to service requests from non-resident requestors who may wish to perform an invalidate operation in the tag buffer or at least to search the tag buffer to ascertain whether an invalidate operation is necessary.

By alternating the tag buffer cycles with resident and non-resident requestors the cycle time of the resident requestor is kept constant since the data buffer cycle time is longer anyway. Thus, non-resident requestors have access to the resident requestor's tag buffer without any degradation of the resident requestor's performance while it obtains data from its own data buffer.

The sequence of events which may occur in this configuration is as follows:

First a resident requestor that desires to read a data word from its dedicated cache memory accesses both the tag buffer and the data buffer of its dediated cache memory. A comparison is made on the tag buffer address to ascertain whether the particular data word requested is stored in the resident requestor's dedicated cache memory's data buffer. If a match occurs the resident requestor must then wait for the access time of its data buffer before reading that data word from its data buffer. Meanwhile, the addressing of the resident requestor's tag buffer is switched to a non-resident requestor. A comparison is made on the tag buffer with address to the address supplied by the non-resident requestor that has written a data word having that address in the non-resident requestor's data buffer main memory. If no match occurs on that address, then the resident requestor's data buffer does not contain a copy of the data word written by the non-resident requestor and hence there is no need to invalidate an entry in the tag buffer of the resident requestor. By this time the resident requestor's data buffer is done with the resident requestor's read operation and the resident requestor is permitted a second read operation request. However, if a match had occurred in the non-resident requestor's access to the resident requestor's tag buffer, the resident requestor's tag buffer is not affected at this time, and another request from the resident requestor is allowed. However, as soon as the resident requestor has completed its second request to its tag buffer the same non-resident requestor is allowed access to the resident requestor's tag buffer and an invalidation operation is performed in the resident requestor's tag buffer so that when the resident requestor may desire to read that particular data word at a later time it will note that that data is invalidated and the resident requestor will have to obtain that data word from main memory, thus preventing the problem of ambiguous data due to multiple copies of data words contained in separate dedicated cache memories.

DESCRIPTION OF THE PREFERRED EMBODIMENT

Figure 1:
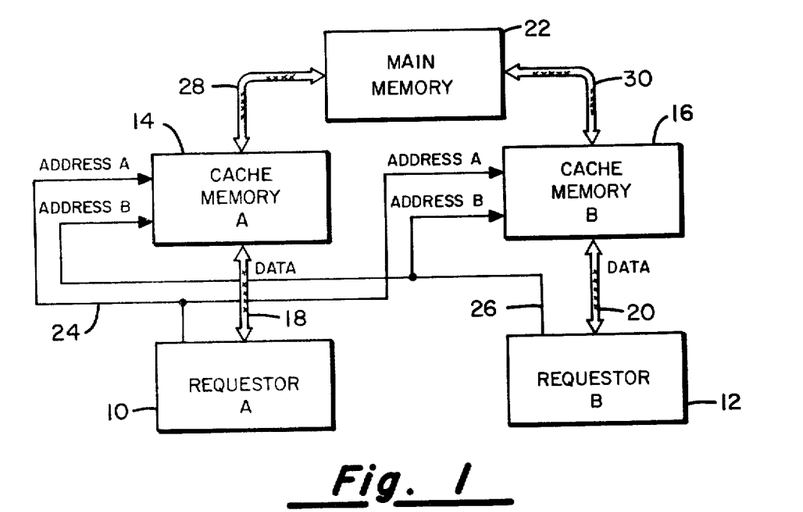
FIG. 1 is a general block diagram illustrating multi-requestor dedicated cache memories and a shared main memory.

FIG. 1 illustrates a representative dedicated cache memory system containing two requestors of data, requestor A 10 and requestor B 12. Each requestor has its own separate fast cycle time dedicated cache memory. In this case requestor A has its own dedicated cache memory A 14 and requestor B 12 has its own dedicated cache memory B 16. Requestor A 10 is connected to its dedicated cache memory A 14 via data lines 18 and similarly requestor B 12 is connected to its own dedicated cache memory B 16 via data lines 20. Both dedicated cache memories 14 and 16 are also connected via data lines 28 and 30 to a large capacity slower cycle time main memory 22. Requestor A 10 addresses its own dedicated cache memory A 14 via address lines 24 and also addresses cache memory B 16 via the same address lines 24. Similarly requestor B 12 addresses its own cache memory B 16 via address lines 26 and also addresses cache memory A 14 via the same address lines 26.

It is indicated in the dedicated cache memory system illustrated by the simplified block diagram of FIG. 1 that requestor A 10 obtains certain data words which are contained in its own separate dedicated cache memory unit A 14 instead of having to go directly to the larger capacity but much slower main memory 22. Requestor A 10 has the capability to address cache memory B 16 but has no provision for obtaining data from it. The sole purpose for enabling requestor A 10 to address cache memory B 16 is to prevent the presence of ambiguous data in cache memory B 16 should a particular data word be contained both in cache memory A 14 and cache memory B 16 and requestor A 10, for example, writes or operates upon that data word in the cache memory A 14. Requestor B 12 must then be prevented from obtaining the outdated data word contained in cache memory B 16. Requestor A 10 accesses cache memory B 16 via address lines 24 to perform this invalidation. Similarly, requestor B 12 also has access via address lines 26 to cache memory A 14 for similar invalidation requests.

An alternative arrangement in accordance with the present invention, would be to have all non-resident requestors pass through a selector to have access to a dedicated cache memory instead of having each non-resident requestor have independent separate access to all dedicated cache memories. In this way only two access ports are required for each dedicated cache memory instead of an access port for each requestor. This alternative approach, however, does require a selection process among all non-resident requestors desiring access to a dedicated cache memory.

Figure 2:
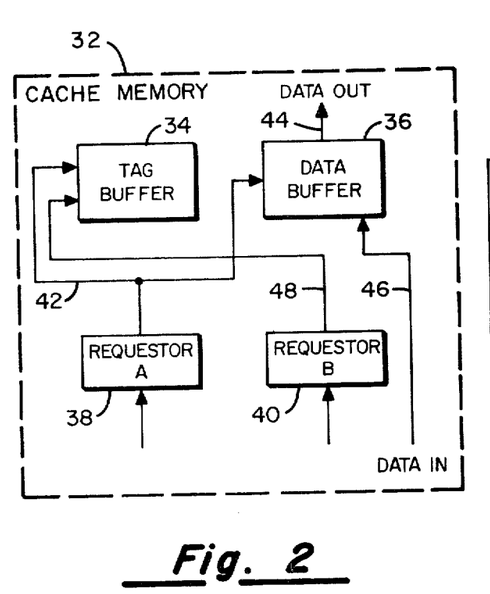
FIG. 2 is a general block diagram illustrating the tag buffer and data buffer components of a dedicated cache memory.

FIG. 2 illustrates in simplified block diagram form the major components of one of the dedicated cache memories A 14 or B 16, illustrated in FIG. 1. Specifically, FIG. 2 contains the important components of the dedicated cache memory and requestor interfaces. The dedicated cache memory and main memory interfaces referred to in FIG. 1 are not illustrated again in FIG. 2 as these interfaces are not changed from the prior art and representative schemes are widely available in the prior art.

The dedicated cache memory unit 32 illustrated in FIG. 2 contains a tag buffer 34 and a data buffer 36. As previously pointed out, the data buffer 36 contains the data words which are contained within the cache memory unit 32 and the tag buffer 34 contains a list of addresses of the data words that are contained in the data buffer 36. Also illustrated are two registers 38 and 40. Register 38 holds the address of requestor A to the cache memory unit 32. Register 40 holds the address of requestor B to the cache memory unit 32. In this illustration, requestor A whose requestor address is held in register 38 is the resident requestor for this particular cache memory unit 32. The requestor B, whose requestor address is held in register 40, is the non-resident requestor. The address from requestor A that is held in register 38 is applied, via address lines 42, to both the tag buffer 34 and the data buffer 36. This allows requestor A to send an address to the cache memory unit 32 to be held in register 38. From register 38 the address is applied via address lines 42 to the tag buffer 34 from which a search is made to ascertain whether the data word having that particular address is contained in the data buffer 36. At the same time the requestor A's address is also transmitted along address lines 42 to the data buffer 36, the reading out of the particular data word desired is commenced. Upon a match in the tag buffer 34 the data word is read out from the data buffer 36 to the data output lines 44. Similarly, if requestor A wishes to writs a data word in its dedicated cache memory unit 32 the address is also contained in register 38 and applied to the tag buffer 34 and the data word is stored in the data buffer 36 along data input lines 46.

Requestor B of FIG. 2 is the non-resident requestor. Therefore, requestor B is allowed access only to the tag buffer 34 portion of the cache memory unit 32. This access to the tag buffer 34 is only for the purpose of searching the tag buffer 34 to ascertain whether a particular data word is contained in the data buffer 36 and for performing an invalidating operation upon the entry contained in the tag buffer 34 if that data word is in fact contained in the data buffer 36. Requestor B's address is held in register 40 and transmitted along address lines 48 to the tag buffer 34.

In general, FIG. 2 represents that a resident requestor, in this case requestor A, is allowed access to both the tag buffer 34 and data buffer 36 of its resident cache memory unit 32 while a non-resident requestor, in this case requestor B, is allowed access only to the tag buffer 34 of the cache memory unit 32.

Figure 3:
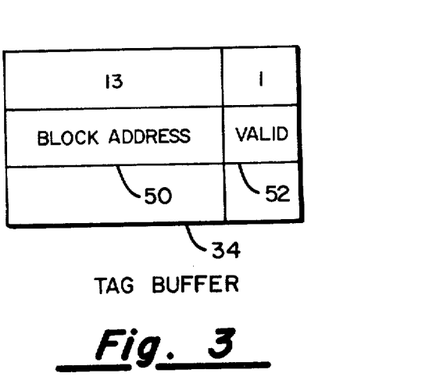
FIG. 3 is a representation of an entry contained in one of the tag buffers illustrated in FIG. 2.

FIG. 3 is representative of a single entry contained in the tag buffer 34 which was originally described in FIG. 2. Here the tag buffer 34 contains an entry consisting of two parts. The first part is a block address 50 and the second part is a valid entry 52. The block address 50 is utilized to ascertain if a match occurs between the requested data word and the data words resident in the data buffer portion of the cache memory unit and the valid entry 52 is utilized to ensure that the data word contained in the data buffer, should a match occur, is of a current nature, i.e., it has not been made ambiguous due to the modification of the same data word in the other dedicated cache memory data buffers. Operation of these two portions of the tag buffer may be more readily understood with reference to FIG. 4.

Figure 4:
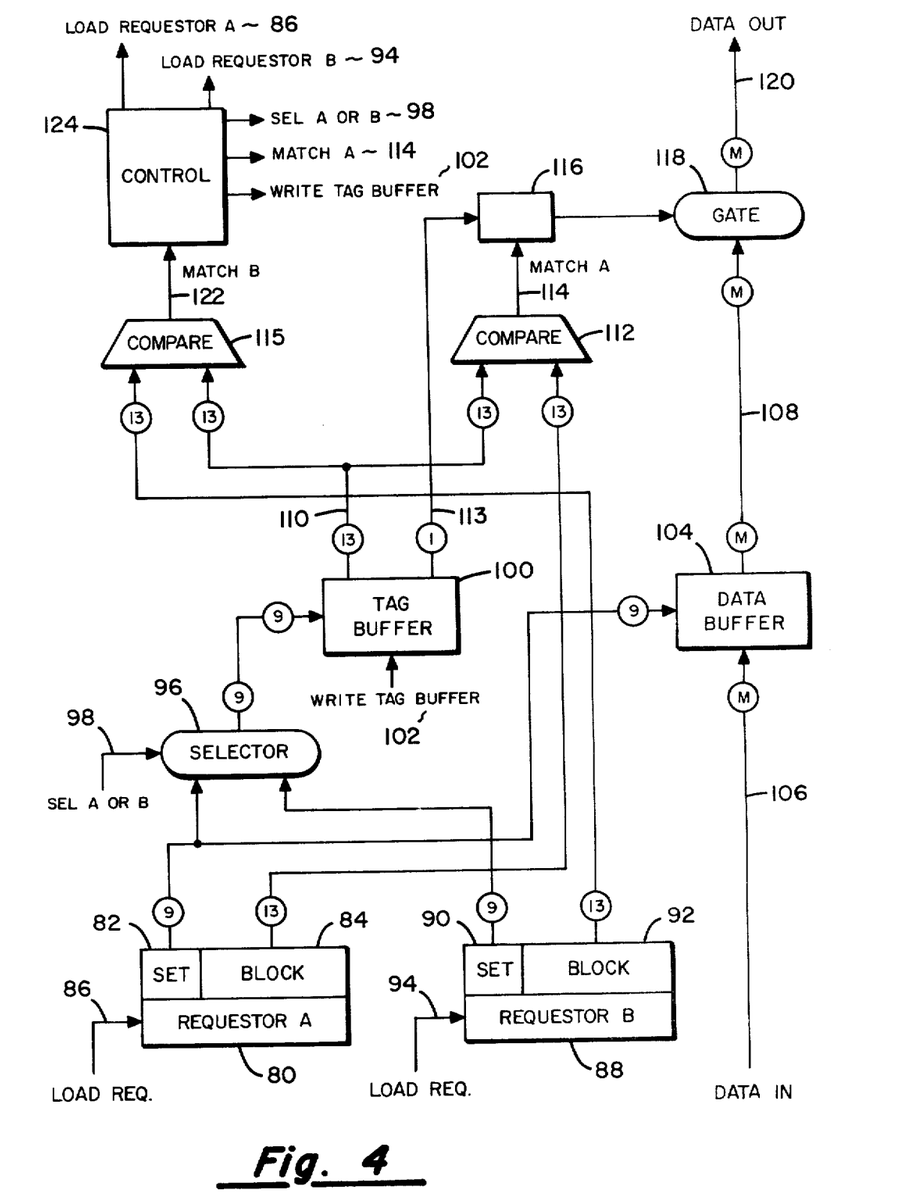
FIG. 4 is a detailed diagram of the dedicated cache memory illustrating the hardware necessary to accomplish the multiplexing of the tag buffer in a dedicated cache memory.

FIG. 4 is a detailed diagram of a cache memory showing the interface between the cache memory and the requestors servicing it. Again, as in the cache memory described in FIG. 2, two requestors are shown as having access to this cache memory, requestor A and requestor B. Again, as in FIG. 2, requestor A is shown to be the resident requestor and requestor B is shown to be the non-resident requestor. Requestor A's address is held in register 80 and is shown divided into two portions, a set address 82 and a block address 84. Although the specific implementation of the number of total address bits and the number of address bits contained in each portion of requestor A's address is a design choice and can vary depending upon individual design requirements, as illustrated, the set address 82 portion of requestor A's address is illustrated to be nine bits and the block address 84 portion of requestor A's address is indicated to be 13 bits. This requires a total of a 22-bit register A for holding requestor A's address. Register 80 is controlled by a load register signal 86. Register 80 may be constructed out of individual binary flip-flops or may be constructed out of any of a number of commercially available register or latch circuits.

Register 88 holds the non-resident requestor, requestor B, address and is again shown separated into two portions, the set address 90 portion 90 and the block address 92 portion. The set address 90 portion is illustrated as also being nine bits to correspond with the set address 82 portion of register 80 and the block address 92 portion is also illustrated as 13 bits to correspond with the 13 bits of the block address 84 portion of register 80. Register 88 holds requestor B's address. Register 88 is controlled by load register signal 94. The register 88 may be constructed of individual binary flip-flops or may be constructed of any of a number of commercially available registers and latches.

Both the set address 82 portion of register 80 and the set address 90 portion of register 88 are applied to the inputs of a two-input selector 96. This selector is controlled by single select A or B line 98. Selector 96 is a common binary two-input selector and may be constructed out of NAND gates or commercially available two-input selectors. Selector 96 passes either the nine-bit set address 82 portion of requestor A or the nine-bit set address 90 portion of requestor B. This nine-bit set address is then applied directly to the address inputs of the tag buffer 100. The tag buffer 100 contains a block address and a valid entry as illustrated in FIG. 3. The tag buffer 100 is a set associative memory unit and may be constructed out of any number of commercially available set associative memory parts such as the Motorola MCM10152 or the Fairchild F10414. The tag buffer 100 is written by means of write tag buffer signal 102.

The set address 82 portion of register 80 is also applied directly to the address lines of the data buffer 104. This data buffer is a commonly available random access memory unit and any number of such random access memory units may be utilized for this purpose. Two examples of a random access memory circuit which may be utilized in this instance are the Motorola MCM10146 and Fairchild F10415. The data buffer 104 is written from the data input lines 106 coming from the data lines from requestor A and has as an output data output lines 108.

The block address 110 portion of the tag buffer 100 is sent to a comparator 112 along with the block address 84 portion of register 80. The comparator 112 simply compares, binary bit for binary bit, the 13-bit block address 110 signal from the tag buffer 100 with the 13-bit block address 84 portion from requestor A address register 80. If all 13 bits match, that is compare favorably in binary significance, the comparator 112 sends a match signal 114. Comparator 112 may be constructed out of simple NAND circuits or any number of commercially available comparator circuits may be utilized for this circuit. The match signal 114 is then ANDed with the valid entry 113 from the tag buffer 100 and the result latched in flip-flop 116. The output of flip-flop 116 then controls a gate 118 which has as its input the data output 108 from the data buffer 104. If the flip-flop 116 allows gate 118 to pass data, the data is then sent from the cache memory unit to requestor A along data output lines 120.

We have thus far described the operation of the cache memory unit when servicing a request from requestor A and the reading of a data word from the data buffer based upon a match of the requestor A address in the tag buffer. This entire operation is completed with the control line 98 from selector 96 set such that selector 96 passes the set address 82 portion of the requestor A's address register 80. The set address 82 portion of requestor A's address register 80 is applied to the tag buffer 100 address lines and obtained is a 13-bit block address 110 indicating which block of that set is resident in the data buffer, if any. This block address is then applied to comparator 112 along with the block address 84 portion of requestor A's address register 80. A favorable comparison there indicates a match between the requestor A's requested data word and a data word contained in the data buffer 104. Flip-flop 116 then allows a check of the valid entry 113 from the tag buffer 100 to ensure that the data word contained in the data buffer 104 is presently valid and has not been made ambiguous due to a write in another dedicated cache memory. The favorable presence of the valid entry 113 and the comparison signal 114 indicates that gate 118 will allow the data word to pass along data output line 120 to requestor A.

With the representative parts selected for the tag buffer 100 and the data buffer 104 the following comparisons can be made with respect to the delay times encountered in passing through circuit paths. It is approximated that the tag buffer 100 constructed from the suggested circuitry will represent a time delay of approximately 30 nanoseconds. Additionally, the comparison network 112 represents an approximate additional delay of 16 nanoseconds resulting in a total delay to that point of approximately 46 nanoseconds. This is in comparison to a delay through the data buffer 104, constructed of the suggested representative circuit, of approximately 50 nanoseconds. Additionally, approximately 35 nanoseconds is required in the gating circuit 118. Thus, the delay through the data portion of the cache memory unit is approximated at 85 nanoseconds. It can be seen that the delay through the data portion, i.e., data buffer 104, is approximately twice the delay through the match portion of the circuitry, i.e., tag buffer 100, of the cache memory which approximates 46 nanoseconds. Thus, if the tag buffer 100 and the data buffer 104 are both accessed at approximately the same time the tag buffer 100 will be available for approximately the last half of the cycle time required for data buffer 104.

It is during this time period that advantage is taken of the faster service of the tag buffer 100 and the set address 90 from register B's address register 88 is applied through selector 96 with control line 98 set to pass requestor B's set address 90 to the tag buffer 100. In the tag buffer 100 another search is made and a 13-bit block address 110 is obtained. This 13-bit block address 110 is sent to comparator 115, sseparate but identical in function and construction to comparator 112. Comparator 115 also has as an input the 13-bit block address 92 from requestor B's address register 88. Comparator 115 then compares the bit-by-bit binary significance of the block address 110 contained in the tag buffer 100 and the block address 02 contained in register B's address register 88. The comparator 115 then outputs a match signal 122 indicating a favorable comparison between those signals. The match signal 122 is sent to control circuitry 124 for further decision making process.

This represents one complete pass through the nonresident requestor's access to the tag buffer. Note that the approximate delays through the tag buffer reference portion from the nonresident requestor involves approximately the same amount of delay as from the resident requestor, that is the 30 nanoseconds approximated through the tag buffer and the 16 nanoseconds approximated through the comparison network. It is to be emphasized that the resident requestor's access through the tag buffer and the non-resident requestor's access to the tag buffer may take place at approximately the same period of time as the resident requestor's access through the data buffer. Thus, requestor B is able to steal access to requestor A's tag buffer without degrading the performance of requestor A from its data buffer 104.

If a match occurs on match signal 122 from comparator 115 this indicates that requestor B has indeed found another copy of the data word which is presumably as written elsewhere in its own dedicated cache memory. This being the case it is necessary for requestor B to access the tag buffer 100 again in a subsequent cycle in order to change the valid entry 113 contained in the tag buffer 100. Once the valid entry 113 has been modified in the tag buffer 100 a subsequent request by requestor A for that particular data word will result in a negative setting of flip-flops 116 which will prevent the gating of the data word from gate 118. It will prevent the access of ambiguous data by requestor A.

Further operation of the circuitry described in FIG. 4 will be illustrated by reference to the timing signals shown in FIG. 5 which represent the control signals for the circuits shown in FIG. 4 and represent those control signals supplied by control block 124 in FIG. 4.

Figure 5:
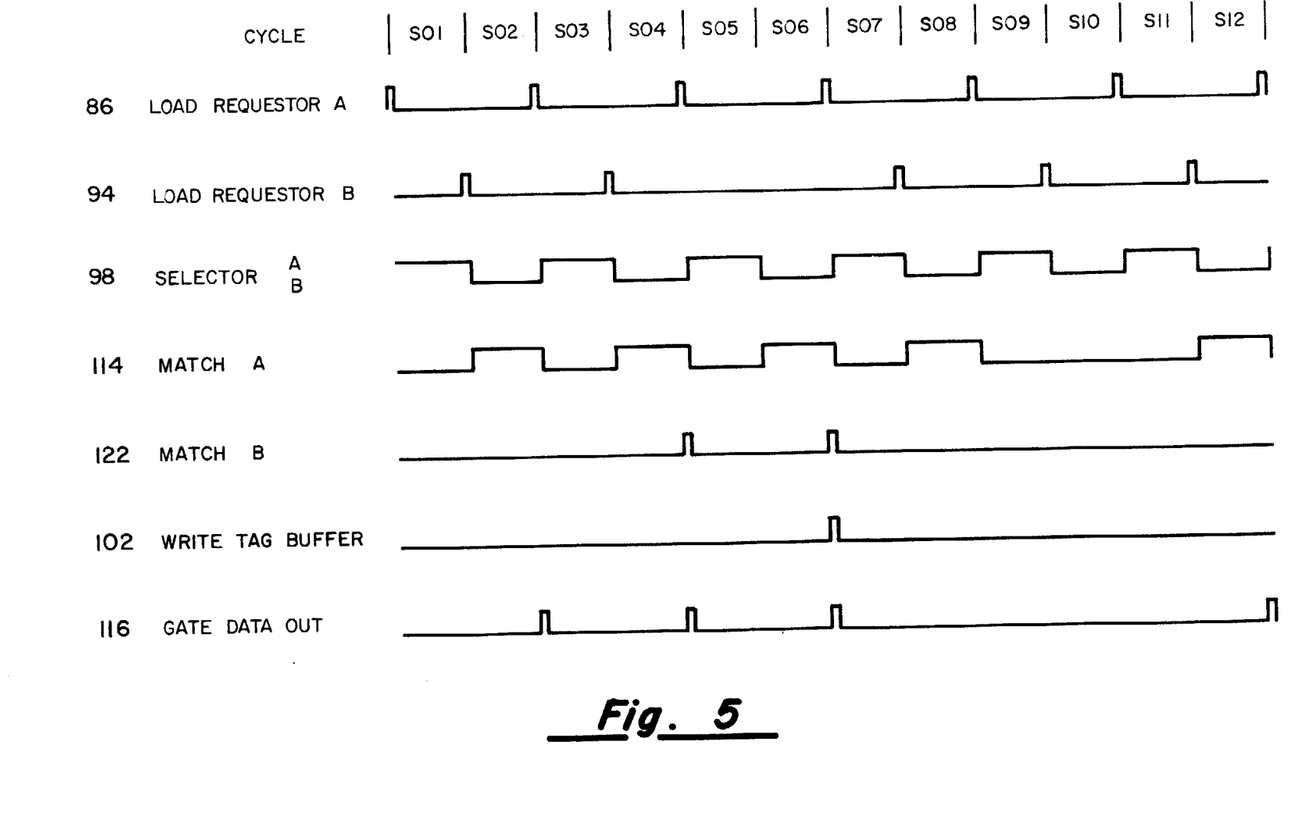
FIG. 5 is a timing diagram illustrative of timing control signals illustrated in FIG. 4.

In FIG. 5 a series of clock cycles is illustrated. In particular, twelve clock cycles are illustrated, specifically designated with reference numerals S01 through S12, inclusive, for ease of description. One cycle of the clock as illustrated in FIG. 5, e.g., cycle S01, represents that time required to pass through the tag buffer portion of the cache memory unit or approximately one half of the time required to pass through the data buffer portion of the cache memory unit.

During each odd clock cycle, i.e., S01, S03, . . . S11, the tag buffer is servicing requests from the resident requestor A. At this same time during the odd clock cycles the data buffer cycle is commenced. During the even clock cycles, i.e., S02, S04, . . . S12, the tag buffer is servicing requests from requestor B, i.e., from requestors who are attempting to search and or conduct an invalidate operation.

In cycle S01 the requestor A's address is loaded by load requestor A signal 86 into register 80. At this time, selector signal 98 is set to select requestor A and set address 82 is applied to the tag buffer 100. Simultaneously, the set address 82 is also applied to the data buffer 104 The block address 110 obtained from the tag buffer 100 is then compared, resulting in a favorable match on match signal 114 indicated at the end of cycle S01. This signal indicates that the data word requested by requestor A is resident in the data buffer 104. During cycle S02, since the tag buffer 100 is now finished determining whether the data word requested by requestor A is resident in the data buffer 104, the selector signal 98 is selected to send set address 90 from requestor B to the tag buffer 100. As indicated by match signal 122 at the end of signal S02 a match was not found and hence the word searched by requestor B for possible invalidation is not present in the data buffer 104 and an invalidation need not be performed. Also by the end of cycle S02 the data buffer 104's access is completed and the data is gated out as illustrated by match signal 114. Also at the end of cycle S02 a new address is loaded into requestor A's address register 80 via load requestor A signal 86. This commences a new access round for requestor A. At this time note that selector signal 98 is set back to set address 92 for requestor A. The same process is repeated in cycle S03 as was present in cycle S01 for requestor A's address. Again, at the end of cycle S03 match signal 114 indicates that a match has occurred and the data word requested by requestor A is present in data buffer 104 once again. At the end cycle S03 another address is loaded into register 88 by via load requestor B signal 94 representing a new address from the non-resident requestor, requestor B. During cycle S04 selector signal 98 is set sending the set address 90 portion of requestor B's address to the tag buffer 100. At the end of cycle S04 match signal 122 indicates that there is a match between the requestor B's address and a data word contained in the data buffer 104. Thus, it will be necessary to perform an invalidate operation upon the tag buffer 100 in order to prevent the presence of ambiguous data. However, there is not time to conduct such an invalidation during this clock cycle S04. During clock cycle S05 another request is loaded into requestor A's address register 80 via load register signal 86 and again another match is obtained on match signal 114 at the end of cycle S05. During cycle S06 since an invalidation operation is still required in the tag buffer 100 instead of servicing a new requestor B access to the tag buffer a load requestor B address signal 94 does not occur and the same address as was contained in cycle S04 is retained for the invalidate operation during cycle S06. With the selector signal 98 again set back to requestor B, a comparison in comparator 115 resulting in match B signal 122 need not be performed again since that comparison operation was performed during cycle S04. Instead, during cycle S06 it is only necessary to operate the invalidate portion of the cycle by triggering write tag buffer signal 102 which will change the valid entry 113 in the tag buffer 100 for the selected address. This is accomplished by the end of cycle S06 and cycle S07 again begins a new request from requestor A and the selector 98 is sent back to requestor A.

Assume that the address requested by requestor A at the beginning of cycle S07 is that particular data word that has just been invalidated during cycle S06 by requestor B. In this case the comparator 112 still indicates a match between the block address 110 contained in the tag buffer 100 and the block address 84 contained in requestor A's address register 80. However, the valid entry 113 is not present, and, accordingly, the gate out signal from flip-flop 116 is not present. The data that is contained in the data buffer 104 and which is now obsolete is not gated out to requestor A during cycle S08. During cycle S08 a new request is serviced from requestor B for a potential invalidate operation. Since match signal B 122 shows no further matches between requested addresses and the locations in the data buffer 104 no further invalidate operations are required to be performed. During cycle S09 requestor A again requests a new address from the tag buffer and this time match signal 114 indicates that there is no match indicating that the particular word requested is not contained in the data buffer 104. Cycle S10 represents another request from requestor B for a possible invalidate operation, however no match is found. Cycle S11 represents a new request for a new data word from requestor A and again a match is found and that word is gated out at the end of cycle S12.

With the illustration of the timing sequence and timing diagrams of the control signals in FIG. 5 and with reference to the specific logic circuitry contained in FIG. 4 it should be clear how the apparatus of the present invention time multiplexes requests from resident requestors to obtain data words from the data buffer while invalidate requests require only the use of the tag buffer from non-resident requestors desiring to avoid ambiguous data in the dedicated cache memory unit system.

What is claimed is:

1. In a computer system including a plurality of requestors, each requestor being a resident requestor to its own dedicated cache memory but a non-resident requestor to the dedicated cache memories of the other requestors of the computer system, the cache memories storing copies of data words that are stored in a main memory, the improvement wherein each of said dedicated cache memories comprises:
   data buffer means having a plurality of addressable locations therein for storing a plurality of data words thereat and having a first, relatively slow, memory cycle;
   tag buffer means having a plurality of addressable locations therein for storing a data word address and an associated invalidate bit at each of said addressable locations and having a second, relatively fast, memory cycle that is of substantially less duration than that of said first memory cycle;

selector means for alternatively coupling to said tag buffer means a first portion of a resident requestor address or a first portion of a non-resident requestor address for reading out the data word address and associated invalidate bit that are stored in said tag buffer means at the addressed addressable location;

resident requestor comparator means coupled to a second portion of said resident requestor address and to the data word address read out of said tag buffer means for generating a resident requestor match or mismatch signal;

non-resident requestor comparator means coupled to a second portion of said non-resident requestor address and to the data word address read out of said tag buffer means for generating a non-resident requestor match or mismatch signal;

invalidate bit bistable means for generating a data out gate signal upon the coupling thereto of a valid condition invalidate bit and a resident requestor match signal;

data out gating means coupled to said data buffer means and said invalidate bit bistable means for gating out a data word from said data buffer means only if the read out invalidate bit is in a valid condition and said resident requestor comparator means is generating a resident requestor match signal;

control means enabling said resident requestor comparator means to compare, during a first portion of a first one of said first memory cycles, the second portion of said resident requestor address of the data word address read out of said tag buffer means for generating said resident requestor match or mismatch signal, said resident requestor match signal enabling, in turn, said invalidate bit bistable means to gate said data word from said data buffer means through said data out gating means;

said control means enabling said non-resident comparator means to compare, during a second portion of said first one of said first memory cycles, the second portion of said non-resident requestor address to the data word address read out of said tag buffer means for generating said nonresident requestor match or mismatch signal; and, said non-resident requestor comparator means match signal conditioning said control means to set, during a second portion of a second, subsequent one of said first memory cycles, the invalidate bit of the addressed addressable location in said tag buffer means to an invalid condition.

2. In a computer system including a plurality of requestors, each requestor being a resident requestor to its own dedicated cache memory but a non-resident requestor to the dedicated cache memories of the other requestors of the computer system, the cache memories storing copies of data words that are stored in a main memory, the improvement wherein each of said dedicated cache memories comprises:

data buffer means having a plurality of addressable locations therein for storing a plurality of data words thereat and having a first, relatively slow, memory cycle;

tag buffer means having a plurality of addressable locations therein for storing a data word address and an associated invalidate bit at each of said addressable locations and having a second, relatively fast, memory cycle that is less than one half that of said first memory cycle;

resident requestor address register means for storing the address of a data word requested by its resident requestor;

non-resident requestor address register means for storing the address of a data word that is requested by a non-resident requestor of said plurality of requestors;

selector means for alternatively coupling to said tag buffer means a first portion of said resident requestor address or a first portion of said non-resident requestor address for reading out the data word address and associated invalidate bit that are stored in said tag buffer means at the tag buffer means addressed addressable location;

resident requestor comparator means coupled to a second portion of said resident requestor address and to the data word address read out of said tag buffer means for generating a resident requestor match or mismatch signal;

non-resident requestor comparator means coupled to a second portion of said non-resident requestor address and to the data word address read out of said tag buffer means for generating a non-resident requestor match or mismatch signal;

invalidate bit gating means for generating a data out gate signal when a valid condition invalidate bit and a resident requestor match signal are coupled thereto;

data out gating means coupled to said data buffer means and said invalidate bit gating means for gating out the data word read out of said data buffer means to said resident requestor only if said data out gate signal is generated by said invalidate bit gating means;

control means enabling said resident requestor comparator means to compare, during the first half of a first one of said data buffer means' relatively slow first memory cycles, the second portion of said resident requestor address to the data word address read out of said tag buffer means for generating said resident requestor match or mismatch signal;

said control means enabling said non- resident comparator means to compare, during the second half of said first one of said data buffer means' relatively slow first memory cycles, the second portion of said non-resident requestor address to the data word address read from said tag buffer means for generating said non-resident requestor match or mismatch signal; and, said non-match requestor comparator means match signal conditioning said control means to set, during the second half of a second, subsequent one of said data buffer means' relatively slow first memory cycles, the invalidate bit of the addressed addressable location in said tag buffer means to an invalid condition.

3. In a computer system including a plurality of requestors, each requestor being a resident requestor to its own dedicated cache memory but a non-resident requestor to the dedicated cache memories of the other requestors of the computer system, the cache memories storing copies of data words that are stored in a main memory, the improvement wherein each of said dedicated cache memories comprises:

data buffer means having a plurality of addressable locations therein for storing a plurality of block of data words thereat and having a first, relatively slow, cycle time;

tag buffer means having a plurality of addressable locations therein for storing a plurality of data word addresses and associated invalidate bits thereat and having a second, relatively fast, cycle time that is approximately one half that of said first cycle time;

resident requestor address register means for storing the address of a data word requested by its resident requestor;

non-resident requestor address register means for storing the address of a data word that is requested by one of the other, non-resident, requestors of said plurality of requestors;

selector means for alternatively coupling to said tag buffer means a first portion of said resident requestor address from said resident requestor address register means or a first portion of said non-resident requestor address from said non-resident requestor address register means for reading out the data word address and associated invalidate bit that are stored in said tag buffer means at the tag buffer means addressed addressable location;

resident requestor comparator means coupled to said tag buffer means and said resident requestor address register means for comparing a second portion of said resident requestor address from said resident requestor address register means to the data word address read out of said tag buffer means and generating a resident requestor match or mismatch signal;

non-resident requestor comparator means coupled to said tag buffer means and said non-resident requestor address register means for comparing a second portion of said nonresident requestor address from said non-resident requestor address register means to the data word address read out of said tag buffer means and generating a non-resident requestor match or mismatch signal;

invalidate bit gating means coupled to said resident requestor comparator means and said tag buffer means for generating a data out gate signal upon the coupling thereto of a valid condition invalidate bit from said tag buffer means and a resident requestor match signal from non-resident requestor comparator means;

data out gating means coupled to said data buffer means and said invalidate bit gating means for gating out the data word read out of said data buffer means to said resident requestor only if said data out gate signal is generated by said invalidate bit gating means;

control means enabling said resident requestor comparator means to compare, during the first half of said data buffer means' relatively slow first cycle time, the second portion of said resident requestor address from said resident requestor address register means to the data word address from said tag buffer means for generating said resident requestor match or mismatch signal;

said control means enabling said non-resident comparator means to compare, during the second half of said data buffer means' relatively slow first cycle time, the second portion of said non-resident requestor address from said non-resident requestor address register means to the data word address from said tag buffer means for generating said non-resident requestor match or mismatch signal; and, said non-resident requestor match signal conditioning said control means to set, during the second half of a subsequent one of said data buffer means' relatively slow first cycle time, the invalidate bit of the addressed addressable location in said tag buffer means to an invalid condition.

4. In a computer system including a plurality of requestors, each requestor being a resident requestor to its own dedicated cache memory but a non-resident requestor to the dedicated cache memories of the other requestors of the computer system, the cache memories storing copies of data words that are stored in a main memory, the improvement wherein each of said dedicated cache memories comprises:

data buffer means having a plurality of addressable locations therein for storing a plurality of blocks of data words thereat and having a first, relatively slow, cycle time;

tag buffer means having a plurality of addressable locations therein for storing a plurality of data word addresses and associated invalidate bits thereat and having a second, relatively fast, cycle time that is approximately one half that of said first cycle time;

resident requestor address register means for storing the address of a data word requested by its resident requestor;

non-resident requestor address register means for storing the address of a data word that is requested by one of the other, non-resident, requestors of said plurality of requestors;

selector means for alternatively coupling to said tag buffer means a first portion of said resident requestor address from said resident requestor address register means or a first portion of said non-resident requestor address from said non-resident requestor address register means for reading out the data word address and associated invalidate bit that are stored in said tag buffer means at the tag buffer means addressed addressable location;

resident requestor comparator means;

non-resident requestor comparator means;

means coupling said first portion of said resident requestor address from said resident requestor address register means to said data buffer means for reading out the data word stored in said data buffer means at the data buffer means addressed addressable location;

means coupling said read out data word address from said tag buffer means to said resident requestor comparator means and to said non-resident requestor comparator means;

means coupling a second portion of said resident requestor address from said resident requestor address register means to said resident requestor comparator means for comparing the addresses coupled thereto and generating a resident requestor match or mismatch signal;

means coupling a second portion of said non-resident requestor address from said non-resident requestor address register means to said non-resident requestor comparator means for comparing the addresses coupled thereto and generating a non-resident requestor match or mismatch signal;

invalidate bit gating means;

means coupling the resident requestor match or mismatch signal from said resident requestor comparator means to said invalidate bit gating means;

means coupling the invalidate bit read out of said tag buffer means to said invalidate bit gating means for enabling the resident requestor match signal from said resident requestor comparator means to generate a data out gate signal;

data out gating means;

means coupling the read out data word from said data buffer means to said data out gating means;

means coupling the data out gate signal from said invalidate bit gating means to said data out gating means for gating out the read out data word from said data buffer means to said resident requestor;

control means coupling a select resident requestor signal to said selector means during the first half of said data buffer means' relatively slow first cycle time and enabling said selector means to couple said first portion of the resident requestor address from said resident requestor address register means to said tag buffer means for addressing the associated addressable location in said tag buffer means and coupling the read out resident requestor address to said resident requestor comparator means and coupling the associated invalidate bit to said invalidate bit gating means for enabling said data out gating means to gate out the readout data word from said data buffer means to said resident requestor if said invalidate bit is in a valid condition; and, said control means coupling a select non-resident requestor signal to said selector means during the second half of said data buffer means' relatively slow cycle time and enabling said selector means to couple said first portion of the nonresident requestor address from said non-resident requestor address means to said tag buffer means for addressing the associated addressable location in said tag buffer means and coupling the read out non-resident requestor address to said non-resident requestor comparator means and coupling the non-resident requestor match or mismatch signal to said control means, a non-resident requestor match signal conditioning said control means to enable said non-resident requestor, during the second half of the next subsequent data buffer means' relatively slow first cycle time of said resident requestor means, to set the invalidate bit of the non-resident requestor addressed addressable location in said data buffer means to an invalid condition.

5. In a computer system including a like plurality of requestors and dedicated cache memories, each requestor being a resident requestor to its own dedicated cache memory but a non-resident requestor to the dedicated cache memories of the other requestors of the computer system, each cache memory storing copies of data words that are stored in a main memory at addressable locations in a data buffer and storing address words and associated invalidate bits at addressable locations in a tag buffer, each of said address words associated with different ones of said data words, the method of preventing an ambiguous data word being accessed by a resident requestor from its dedicated cache memory when such data word is made ambiguous by an operation of a non-resident requestor, comprising:

during a first half of a first one of said resident requestor data buffer's memory cycles,
coupling a first portion of a resident requestor address to its tag buffer and to its data buffer for reading out the data word address and its associated invalidate bit from its tag buffer and the data word from its data buffer;

comparing said first portion of said resident requestor address to the data word address that was read out of said tag buffer by said first portion of said resident requestor address;

generating a resident requestor match or mismatch signal from said comparison;

combining the invalidate bit, which was read out of said resident requestor tag buffer by said first portion of said resident requestor address, and said resident requestor match signal for subsequently, during the second half of said first one of said resident requestor data buffer's memory cycle, gating out the data word from said resident requestor data buffer that was addressed by said first portion of said resident requestor address only if said combination is affected by a valid condition invalidate bit;

during the second half of said first one of said resident requestor data buffer's memory cycles,
coupling a first portion of a non-resident requestor address to said resident requestor tag buffer for addressing the data word address and its associated invalidate bit; and, setting said addressed invalidate bit to an invalid condition for preventing the gating out of the data word from said resident requestor data buffer upon the subsequent addressing of the associated data word by the resident requestor address.

6. In a computer system including a like plurality of requestors and dedicated cache memories, each requestor being a resident requestor to its own dedicated cache memory but a non-resident requestor to the dedicated cache memories of the other requestors of the computer system, each cache memory storing copies of data words that are stored in a main memory at addressable locations in a data buffer and storing address words and associated invalidate bits at addressable locations in a tag buffer, each of said address words associated with different ones of said data words, the method of preventing an ambiguous data word from being accessed by a resdident requestor from its dedicated cache memory when such data word is made ambiguous by an operation of a non-resident requestor, comprising:

during a first half of a first one of said resident requestor data buffer's memory cycles,
coupling a first portion of a resident requestor address to its tag buffer and to its data buffer for reading out the data word address and its associated invalidate bit from its tag buffer and the data word from its data buffer;

comparing the data word address read from said tag buffer to a second portion of said resident requestor address;

generating a resident requestor match or mismatch signal from said comparison;

combining the invalidate bit which was read out of said resident requestor tag buffer by said first portion of said resident requestor address, and said resident requestor match signal;

during the second half of said first one of said resident requestor data buffer memory cycles, coupling a first portion of a non-resident requestor address to said resident requestor tag buffer for reading out the data word address and its associated invalidate bit from said resident requestor tag buffer;

comparing a second portion of said non-resident requestor address to the data word address that was read out of said resident requestor tag buffer by said first portion of said non-resident requestor address;

generating a non-resident requestor match or mismatch signal from said comparison;

gating out the data word from said resident requestor data buffer that was addressed by said first portion of said resident requestor address only if said combination of said invalidate bit and said resident requestor match signal is affected by a valid condition invalidate bit;

during a first half of a second one, subsequent to said first one, of said resident requestor data buffer's memory cycles, coupling a first portion of a resident requestor address to its tag buffer and to its data buffer for reading out the data word address and its associated invalidate bit from its tag buffer and the data word from its data buffer;

comparing the data word address read from said tag buffer to a second portion of said resident requestor address;

generating a resident requestor match or mismatch signal from said comparison;

during the second half of said second one of said resident requestor data buffer's memory cycles, coupling said first portion of said non-resident requestor address to said resident requestor tag buffer for addressing the data word address and its associated invalidate bit;

setting said addressed invalidate bit to an invalid condition if said comparison of said second portion of said non-resident requestor address to the data word address that was read out of said resident requestor tag buffer by said first portion of said nonresident requestor address generated said non-resident match signal for preventing the gating out of the data word from said resident requestor data buffer upon subsequent addressing of the associated data word by the resident requestor address.

* * * * *